US008391915B2

(12) United States Patent
Bishop

(10) Patent No.: US 8,391,915 B2
(45) Date of Patent: *Mar. 5, 2013

(54) VIRTUAL CELLS FOR WIRELESS NETWORKS

(75) Inventor: Donald M. Bishop, Highlands Ranch, CO (US)

(73) Assignee: Sandwave IP, LLC, Loveland, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/647,487

(22) Filed: Dec. 26, 2009

(65) Prior Publication Data

US 2010/0099401 A1    Apr. 22, 2010

Related U.S. Application Data

(63) Continuation of application No. 11/457,577, filed on Jul. 14, 2006, now Pat. No. 7,664,504.

(60) Provisional application No. 60/699,091, filed on Jul. 14, 2005.

(51) Int. Cl.
*H04M 1/00* (2006.01)

(52) U.S. Cl. ............ 455/550.1; 455/446; 455/444; 370/328

(58) Field of Classification Search .......... 455/446, 455/550.1, 444; 370/328
See application file for complete search history.

(56) References Cited

U.S. PATENT DOCUMENTS

| | | | |
|---|---|---|---|
| 5,262,588 A | 11/1993 | Gallagher | |
| 5,548,806 A * | 8/1996 | Yamaguchi et al. | 455/441 |
| 5,721,819 A | 2/1998 | Galles et al. | |
| 5,940,765 A | 8/1999 | Haartsen | |
| 5,946,618 A | 8/1999 | Agre et al. | |
| 5,952,972 A | 9/1999 | Ittipiboon et al. | |
| 6,014,564 A * | 1/2000 | Donis et al. | 455/436 |
| 6,023,618 A | 2/2000 | Janhonen et al. | |
| 6,028,853 A | 2/2000 | Haartsen | |
| 6,055,429 A | 4/2000 | Lynch | |
| 6,075,990 A | 6/2000 | Shin | |
| 6,081,723 A | 6/2000 | Mademann | |
| 6,085,238 A | 7/2000 | Yuasa et al. | |
| 6,112,082 A | 8/2000 | Almgren et al. | |

(Continued)

FOREIGN PATENT DOCUMENTS

| | | |
|---|---|---|
| EP | 1172969 A2 | 1/2002 |
| JP | 9232850 A | 9/1997 |

(Continued)

OTHER PUBLICATIONS

"3rd Generation Partnership Project; Technical Specification Group Services and System Aspects; Functional Stage 2 Description of Location Services (LCS) Release 7", 3GPP TS 23.271 v7.3.0, Mar. 24, 2005.

(Continued)

*Primary Examiner* — Danh Le
(74) *Attorney, Agent, or Firm* — Russell S. Krajec; Krajec Patent Offices, LLC

(57) ABSTRACT

In a network having multiple wireless transmitters, a mobile device operating with the network may be assigned one or more wireless transmitters as a virtual cell. Transmissions to the mobile device may be broadcast from several cells simultaneously, so that the mobile device will receive the transmissions in any of the areas covered by the cells. When the network determines that the mobile device is moving out of one cell area and into another, the virtual cell may move as well. The virtual cell may consist of one or many areas covered by a wireless network, and may have a shape that is determined by geography, trajectory, wireless coverage, or other factors.

8 Claims, 4 Drawing Sheets

U.S. PATENT DOCUMENTS

| | | | |
|---|---|---|---|
| 6,125,276 A * | 9/2000 | Lupien | 455/436 |
| 6,324,402 B1 | 11/2001 | Waugh et al. | |
| 6,344,833 B1 | 2/2002 | Lin et al. | |
| 6,351,463 B1 | 2/2002 | DeSantis et al. | |
| 6,484,012 B1 | 11/2002 | Nche et al. | |
| 6,594,273 B1 | 7/2003 | McGibney | |
| 6,665,296 B1 | 12/2003 | Sturza et al. | |
| 6,771,673 B1 | 8/2004 | Baum et al. | |
| 6,897,373 B2 | 5/2005 | Barabash | |
| 6,898,433 B1 | 5/2005 | Rajaniemi et al. | |
| 6,903,702 B2 | 6/2005 | Kawai et al. | |
| 6,917,804 B2 | 7/2005 | Takayama et al. | |
| 6,948,000 B2 | 9/2005 | Desai et al. | |
| 6,961,555 B1 | 11/2005 | Philyaw | |
| 6,980,819 B2 | 12/2005 | Sugaya et al. | |
| 7,010,015 B2 | 3/2006 | Hervey, Jr. et al. | |
| 7,019,691 B1 | 3/2006 | Soltanian et al. | |
| 7,035,637 B2 | 4/2006 | Motegi et al. | |
| 7,039,392 B2 | 5/2006 | McCorkle et al. | |
| 7,047,009 B2 | 5/2006 | Laroia et al. | |
| 7,069,009 B2 | 6/2006 | Li et al. | |
| 7,072,346 B2 | 7/2006 | Hama | |
| 7,072,360 B2 | 7/2006 | Dravida et al. | |
| 7,096,000 B2 | 8/2006 | Yano | |
| 7,171,460 B2 | 1/2007 | Kalavade et al. | |
| 7,231,221 B2 | 6/2007 | Assarsson et al. | |
| 7,233,804 B2 | 6/2007 | Sugaya et al. | |
| 7,254,405 B2 | 8/2007 | Lin et al. | |
| 7,280,534 B2 | 10/2007 | Koppol | |
| 7,313,127 B2 | 12/2007 | Hoctor et al. | |
| 7,406,298 B2 | 7/2008 | Luglio et al. | |
| 7,412,246 B2 | 8/2008 | Lewis et al. | |
| 7,457,271 B2 | 11/2008 | Donovan | |
| 7,471,955 B2 | 12/2008 | Muramatsu | |
| 7,499,460 B2 | 3/2009 | Csapo | |
| 7,519,036 B2 | 4/2009 | Zhang | |
| 7,539,161 B2 | 5/2009 | Bolin et al. | |
| 7,545,826 B2 | 6/2009 | Sugaya | |
| 7,552,034 B2 | 6/2009 | Ebata et al. | |
| 7,555,260 B2 | 6/2009 | Melkesetian | |
| 7,573,862 B2 | 8/2009 | Chambers et al. | |
| 7,586,879 B2 | 9/2009 | Chari et al. | |
| 7,593,718 B2 | 9/2009 | Gorday et al. | |
| 7,606,938 B2 | 10/2009 | Roese et al. | |
| 7,630,311 B2 | 12/2009 | Jung et al. | |
| 7,676,226 B2 | 3/2010 | Han et al. | |
| 7,689,225 B2 | 3/2010 | Funato et al. | |
| 7,706,369 B2 | 4/2010 | Roese et al. | |
| 7,729,337 B2 | 6/2010 | Saleh et al. | |
| 2002/0011953 A1 | 1/2002 | Reece et al. | |
| 2002/0061756 A1 | 5/2002 | Bleckert et al. | |
| 2002/0068584 A1 | 6/2002 | Gage et al. | |
| 2002/0105965 A1 | 8/2002 | Dravida et al. | |
| 2003/0008659 A1 | 1/2003 | Waters et al. | |
| 2003/0128987 A1 | 7/2003 | Mayer | |
| 2003/0133450 A1 | 7/2003 | Baum | |
| 2003/0145106 A1 | 7/2003 | Brown | |
| 2004/0184477 A1 | 9/2004 | Tavli et al. | |
| 2004/0185859 A1 | 9/2004 | Barkan | |
| 2005/0068934 A1 | 3/2005 | Sakoda | |
| 2005/0088992 A1 * | 4/2005 | Bolin et al. | 370/329 |
| 2005/0124294 A1 | 6/2005 | Wentink | |
| 2005/0190757 A1 | 9/2005 | Sajassi | |
| 2005/0286486 A1 | 12/2005 | Miller | |
| 2006/0018276 A1 | 1/2006 | Kim et al. | |
| 2006/0046746 A1 | 3/2006 | Ranford et al. | |
| 2006/0089099 A1 | 4/2006 | Buchwald et al. | |
| 2007/0015516 A1 | 1/2007 | Huotari et al. | |
| 2007/0115883 A1 | 5/2007 | Narayanan et al. | |
| 2008/0133665 A1 | 6/2008 | Lybeck et al. | |
| 2008/0298275 A1 | 12/2008 | DeSousa | |

FOREIGN PATENT DOCUMENTS

| | | |
|---|---|---|
| JP | 2001000004307 | 7/2002 |
| KR | 1020010025591 | 4/2001 |
| WO | WO 98/12885 A2 | 3/1998 |
| WO | WO 2004/062198 A1 | 7/2004 |

OTHER PUBLICATIONS

"3rd Generation Partnership Project; Technical Specification Group Services and System Aspects; Vocabulary for 3GPP Specifications (Release 5)", 3GPP TR 21.905 v5.9.0, Mar. 24, 2005.

IEEE Computer Society, "802.11 FTM IEEE Trial—Use Recommended Practice for Multi-Vendor Access Point Interoperability via an Inter-Access Point Protocol Across Distribution Systems Supporting IEEE 802.11™ Operation", Jul. 14, 2003, Institute for Electrical and Electronics Engineers, Inc., NY, USA.

International Search Report and Written Opinion for PCT/US2006/017222 dated Aug. 25, 2006.

International Search Report and Written Opinion for PCT/US2006/017223 dated Aug. 25, 2006.

International Search Report and Written Opinion for PCT/US2006/027145 dated Dec. 18, 2006.

Press release from Nashville International Airport, "WiFi Arrives at Nashville International Airport," PRESSbooth.org, http://press.xtvworld.com/article-print-2836.html, Oct. 30, 2004.

"The Wi-Fi Business Model—Is There One?", posted by Andrew, Brighthand, Mar. 17, 2004.

"Spontaneous synchronization in multihop embedded sensor networks: demonstration of a server-free approach", Bletsas, A.; Lippman, A.; Wireless Sensor Networks, 2005. Proceeedings of the Second European Workshop on Jan. 31-Feb. 2, 2005. pp. 333-341. See: abstract, Sec. I and Sec. IIV.

Mary Kathleen Flynn, "Have Wi-Fi, Will Travel,", U.S. News and World Report, May 2, 2004.

* cited by examiner

VIRTUAL CELLS FOR WIRELESS NETWORKS

CROSS REFERENCE TO RELATED APPLICATIONS

This application claims priority to and benefit of U.S. Provisional Patent Application Ser. No. 60/699,091 entitled "Virtual Cells for Wireless Networks" by Donald M. Bishop, filed Jul. 14, 2005, and U.S. patent application Ser. No. 11/457,77 entitled "Virtual Cells for Wireless Networks" by Donald M. Bishop, filed Jul. 14, 2006, the entire contents of which are hereby expressly included by reference for all it teaches and discloses.

BACKGROUND OF THE INVENTION a. Field of the Invention

The present invention pertains generally to wireless communication networks and specifically to wireless networks with roaming of mobile devices.

b. Description of the Background

Wireless networks face natural limits on the bandwidth and coverage that can be offered to users. Because a given radio has a limited amount of bandwidth, a network may provide a high bandwidth service over a small area for a few users, or a low bandwidth service over a large area for many more users. As the bandwidth requirements increase, the cell size correspondingly decreases.

For mobile applications, a user or subscriber may move from one area or cell covered by a first radio to a second area covered by a second radio. As the user moves to the new area, communications are handed off to the second radio. With large cells or coverage areas, the movement from one cell to another cell may occur slowly enough that a handoff sequence may happen over one or several seconds.

In today's marketplace, the increase in bandwidth is driving cell sizes smaller to the point where the handoff sequences may be too burdensome to implement.

SUMMARY OF THE INVENTION

In a network having multiple wireless transmitters, a mobile device operating with the network may be assigned one or more wireless transmitters as a virtual cell. Transmissions to the mobile device may be broadcast from several cells simultaneously, so that the mobile device will receive the transmissions in any of the areas covered by the cells. When the network determines that the mobile device is moving out of one cell area and into another, the virtual cell may move as well. The virtual cell may consist of one or many areas covered by a wireless network, and may have a shape that is determined by geography, trajectory, wireless coverage, or other factors.

DETAILED DESCRIPTION OF THE INVENTION

Figure 1:
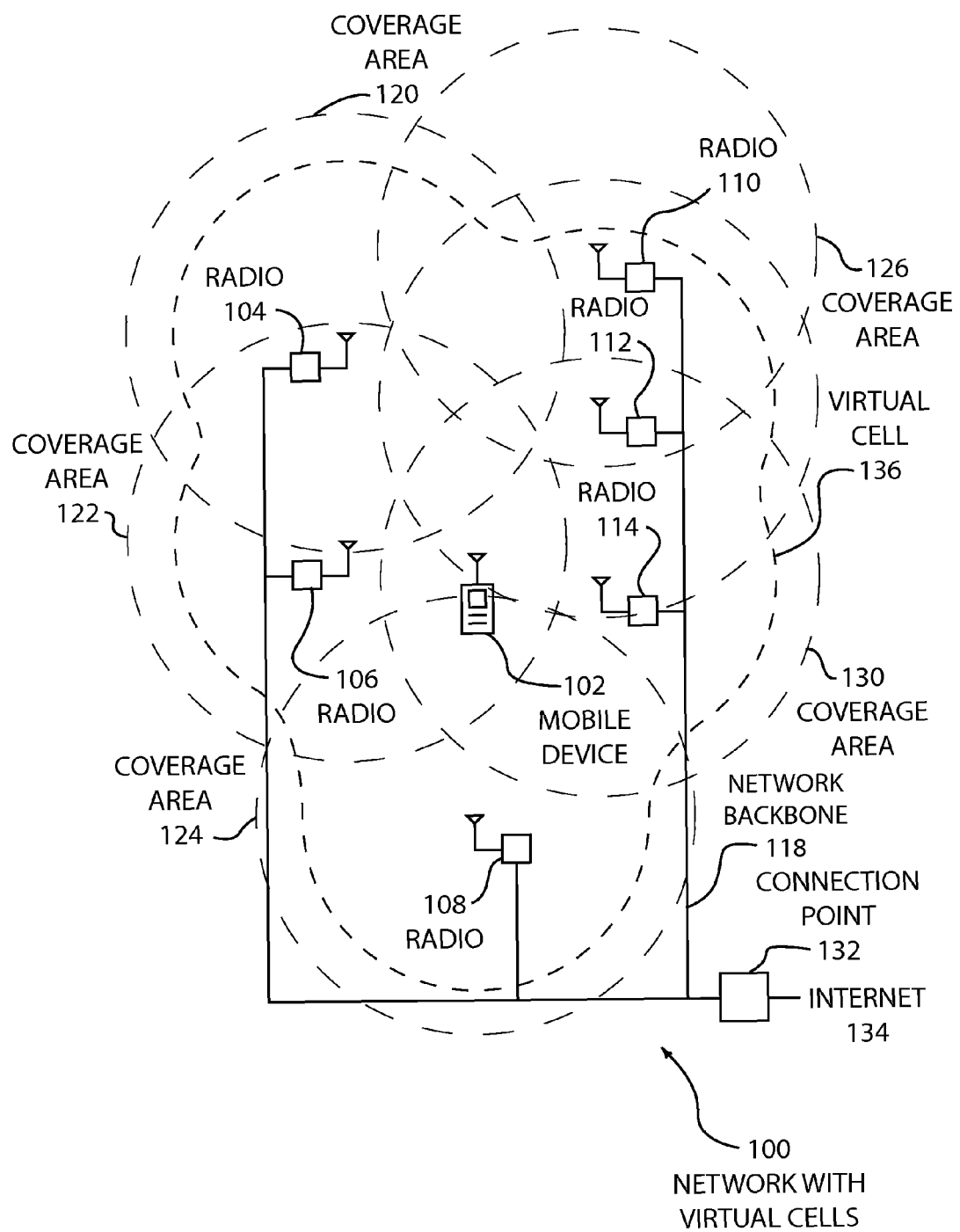
FIG. 1 is a diagrammatic illustration of an embodiment showing a network having virtual cells.

Specific embodiments of the invention are described in detail below. The embodiments were selected to illustrate various features of the invention, but should not be considered to limit the invention to the embodiments described, as the invention is susceptible to various modifications and alternative forms. The invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

FIG. 1 illustrates an embodiment 100 showing a wireless network having virtual cells. A mobile device 102 can communicate with any radio 104, 106, 108, 110, 112, and 114 of the network. The radios are connected by an network backbone 118. Each of the radios 104, 106, 108, 110, 112, and 114 has a coverage area 120, 122, 124, 126, 128, and 130, respectively. The network backbone 118 has a connection point 132 that may be connected to the internet 134 or another network.

When the mobile device 102 is in communication with the network, a 'virtual cell' 136 comprising the radios 104, 106, 108, 112, and 114 may be created. The virtual cell may allow the mobile device 102 to move anywhere within the virtual cell and keep in regular communication with the network.

The network of radios may be any type of wireless network, such as cellular telephones, wi-fi hotspots, 802.11 networks, or any other network where a backbone has several radio transmitters capable of communicating with mobile devices. The mobile devices may be dedicated voice devices, such as mobile telephones, data devices such as laptop computers or personal digital assistants, or combination devices that incorporate voice communication and data communication.

The network backbone 118 may be any type of hardwired, wireless, or combination of communication media to communicate between the various radios and a network connection point 132. For example, hardwired backbones may be a cable television network, such as a hybrid fiber optic/coaxial network, pure fiber optic network, or coaxial cable network. Other examples may include twisted pair network such as digital subscriber line or other broadband connection such as T1 lines. Additionally, the network backbone may include wireless links between one or more radios in the network.

The virtual cell may enable moving devices to continue communication with a wireless network without incurring many handoffs from one radio to another. Such a system may be useful when the coverage areas of the radios of a network are very small with respect to the geospatial movement speed of the device. For example, for small wi-fi hotspots, the coverage area may be 300 feet in diameter. A mobile device in an automobile traveling at highway speeds may traverse such a wi-fi hotspot in a matter of seconds or fraction of seconds. Managing communication handoffs in such situations adds a tremendous amount of overhead in the network bandwidth.

By making several radios attached to the network operate in unison, the performance and service quality of a mobile device communications may be improved for the user or subscriber with the mobile device. Handoff irregularities and dropped communications may be reduced because several radios are capable of receiving and transmitting in unison, and the virtual cell performance may be tailored to the particular situation.

The radios comprising the virtual cell may operate synchronously. For example, when a packet is transmitted from the network to the mobile device 102, each radio within the virtual cell may transmit the packet substantially simultaneously. The mobile device 102 may receive the packet and transmit another packet. The packet from the mobile device may be received by one or more of the radios comprising the virtual cell. Each radio within the virtual cell may be configured to listen for transmissions from the mobile device 102.

When transmitting substantially simultaneously, the radios may use any type of mechanism to synchronize the transmissions. For example, the radios may have a synchronizing signal that is provided through the network backbone or over a wireless communication path, either on or off the normal communications band used for communicating with mobile devices.

Because the distance is different from the mobile device 102 to each of the radios within the virtual cell, the synchronized transmissions from the radios to the mobile device may arrive at staggered intervals. The signals received by the mobile device 102 may be identical, but not precisely synchronized, and may appear to the mobile device 102 as a multipath signal. In many cases, the mobile device 102 may have software or hardware features that process multipath signals in order to extract the underlying communication.

When the mobile device 102 transmits a packet of information, the transmission may be received by two or more radios within the virtual cell 136. In some embodiments, each radio may receive the packet and relay the packet along the network backbone 118. In some cases, a device on the network may recognize the duplicate communication and decide which communication to keep and which to destroy. Such a device may be a network controller, one of the various radios, or other device capable of handling traffic along the network backbone 118.

High speed and high bandwidth radios may be organized into virtual cells. A portion of the normal bandwidth of several radios may be dedicated to processing virtual cell activity for mobile devices, while using the remaining bandwidth for non-moving or lower grades of service. For example, a subscriber to a network may have a special feature allowing mobile roaming within the network. Furthermore, the network may create virtual cells for time sensitive communications, such as real time voice communications.

When high speed radio communications are used with virtual cells, the bandwidth may allow for communication packets to be resent once or multiple times, even for voice communications without the end user experiencing performance degradation. By resending a data packet in certain situations, a telephony call using the virtual cell may have improved quality over cellular telephony.

Figure 2:
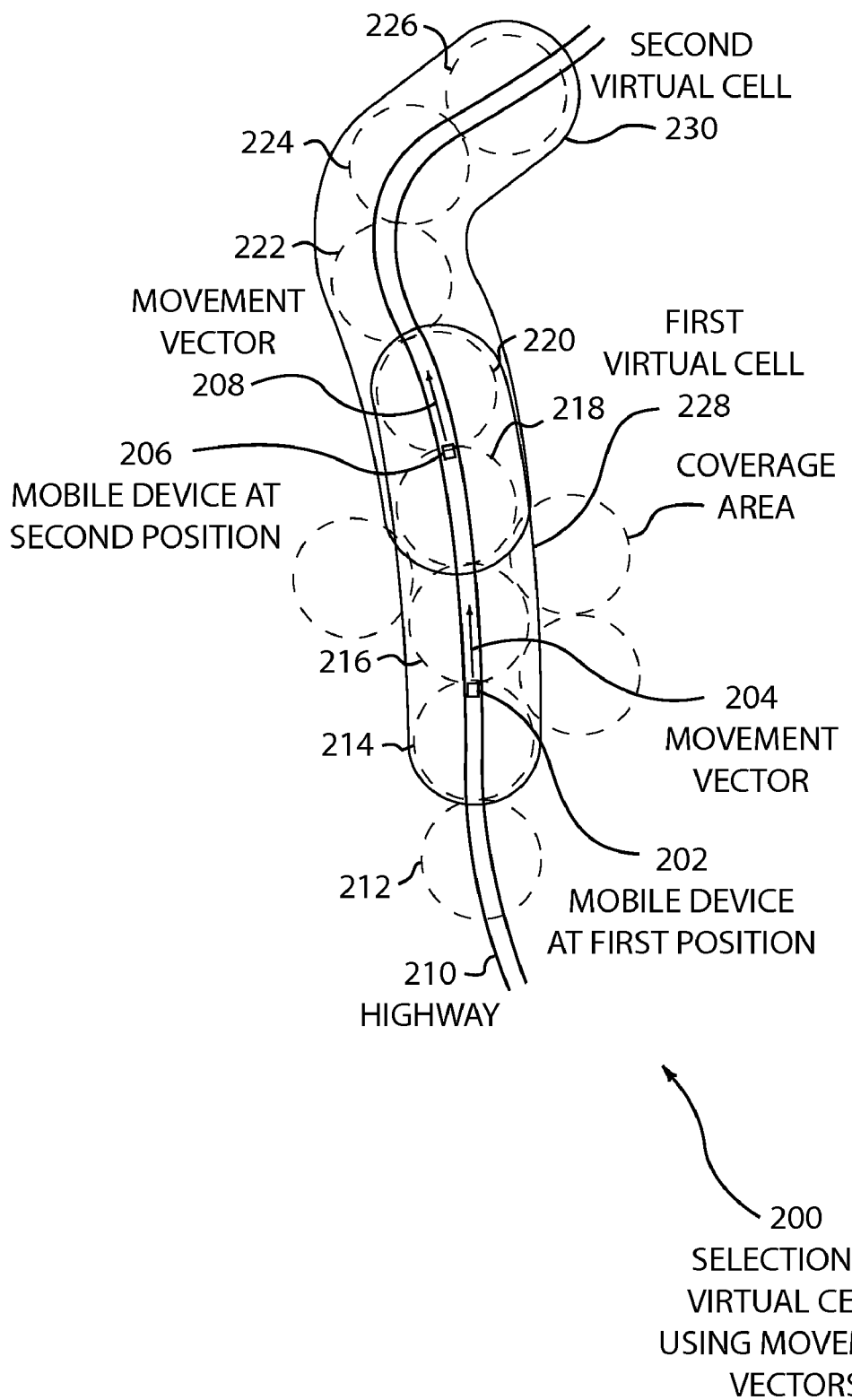
FIG. 2 is a diagrammatic illustration of an embodiment showing the selection of virtual cells using movement vectors.

FIG. 2 illustrates an embodiment 200 showing the selection of virtual cells using movement vectors. A mobile device is shown at a first position 202 with movement vector 204.

The mobile device is also shown at a second position 206 with a second movement vector 208. The mobile device is shown following a highway 210.

From the first position 202 with movement vector 204, a virtual cell 228 may be created from coverage areas 214, 216, 218, and 220. At the second position 206, a virtual cell 230 may comprise coverage areas 218, 220, 222, 224, and 226.

The embodiment 200 illustrates how some virtual cells may be selected based on the movement of a mobile device within the network. As the mobile device moves along the highway 210, the position and movement vector may be determined by communicating with the device in coverage area 212 and then coverage area 214 in succession. From the two communication sessions, the movement vector 204 may be determined.

In some cases, a mobile device may have global positioning system (GPS) capabilities or other geospatial locating capabilities. In such cases, the mobile device may determine a position and movement vector and relay such information to the network to aid in determining a suitable virtual cell.

In general, the signal strength of the mobile device may be detected by one or more of the radios within the various coverage areas. When two or more radios detect the mobile device, the possible location of the mobile device may be determined by triangulation.

The geospatial positions of the radios on the network may be determined by any method. In some embodiments, the geospatial coordinates of the radio transceiver may be determined during installation using surveying equipment or GPS receiving devices. In other embodiments, the geospatial location of the radios may be determined by any other mechanism so that the virtual cell may be constructed based on the position and movement of a mobile device within the network coverage area.

In some embodiments, the various radios may not have specific geospatial coordinates so that a virtual cell may be created based on geospatial positioning. For example, the various network radios may be placed sufficiently close to each other that the radios may detect the radios nearby and communicate with the neighboring radios. When a certain radio communicates with a mobile device, the radio may be able to detect that the mobile device is within the radio's coverage area by measuring the power levels, response time, or other performance factor. Because the mobile device is within the radio's coverage area, the radio may communicate with its neighboring radios to establish a virtual cell. In such an embodiment, the virtual cell will generally be centered about the mobile device.

When a movement vector is determined along with the position of the mobile device, the shape and position of the virtual cell may be elongated in the direction of travel. In some cases, the center of the virtual cell may be in the predicted path of travel in the direction of travel. The magnitude of the movement vector may cause the length of the virtual cell to be extended for fast moving devices or contracted for slow moving devices. In some situations, the virtual cell may change shape, size, and position as the mobile device moves through the network.

Many different mechanisms may be used for calculating the size and shape of the virtual cell. In some cases, each cell may have one or more predefined virtual cells based on the topography and location of adjacent cells. For example, if a network covered a highway in an area without exits, mobile devices on the network may be assumed to be traveling in one direction or the other along the highway. Thus, for each radio coverage area along the highway, a predefined virtual cell may be created for each direction of travel along the highway.

The determination of a virtual cell position may be performed by a network controller that may receive all transmissions to and from the radios attached to the network. Such an example may be a cable television network headend, a controller for a digital subscriber line network, or any other centralized controller. Such a controller may be able to monitor and control all traffic on the network, including determining if two or more transmission packets are received within a virtual cell from a mobile device.

In other embodiments, the radio transceivers or other decentralized devices on the network may be able to determine an appropriate virtual cell for a particular situation. In some cases, a radio transceiver may determine that it is the closest transceiver to the mobile device and that radio transceiver may become the controlling transceiver for the virtual cell. As such, the controlling transceiver may collect and arbitrate all packets from the mobile device that were received by the radios within the virtual cell. Additionally, the controlling transceiver may determine the appropriate size and shape of the virtual cell for the particular situation. In some situations, the controlling transceiver may hand off control of the virtual cell to another transceiver when the mobile device has moved to a different area of the virtual cell. At that point, the virtual cell may be reshaped and repositioned by the second controlling transceiver.

The embodiment 200 illustrates how a virtual cell may be created with a unique shape that is based on certain geographical features of the location of the mobile device. For example, the second virtual cell 230 has a dog leg shape that follows the trajectory of the highway 210. The shape of the virtual cell 230 may be determined by any method, including manually defining a virtual cell for a general location and range of movement vectors to developing virtual cells based on the usage history of previous network users.

When a mobile device moves within a virtual cell, a new virtual cell may be created after some point. In some situations, each time a mobile device moves from the coverage area of one radio to another, the virtual cell may also shift. In other situations, the mobile device may move through several coverage areas within the virtual cell before the virtual cell may shift.

For example, the mobile device in position 202 is in the coverage area 214 and has a virtual cell 228 that stretches through four coverage areas 214, 216, 218, and 220. After the mobile device moves to coverage area 218 into the second position 206, the virtual cell may shift into the second area 230. The radios having coverage areas 214 and 216 are dropped from the virtual cell and radios having coverage areas 222, 224, and 226 are added.

While operating in a virtual cell, the mobile device operates as if it were communicating with one radio. In fact, the mobile device may be communicating with several different radios connected by a network as the mobile device moves within the network. In some embodiments, the virtual cell may have an addressing and communications scheme that simulates the actions of a single radio. In such embodiments, the mobile device may not be able to detect that it is operating in a virtual cell, even though it is moving through several coverage areas and communicating with several independent radios.

For the purposes of illustration, the coverage areas of radio transceivers are shown as circular areas. In practice, some coverage areas may be circular, but other coverage areas may be sectors of a circle or various shapes. In some situations, different radios may be positioned to broadcast in a horizontal fashion, such as to cover a single floor of a multistory building. In such a case, a virtual cell may encompass several radio transceivers that are stacked vertically.

Figure 3:
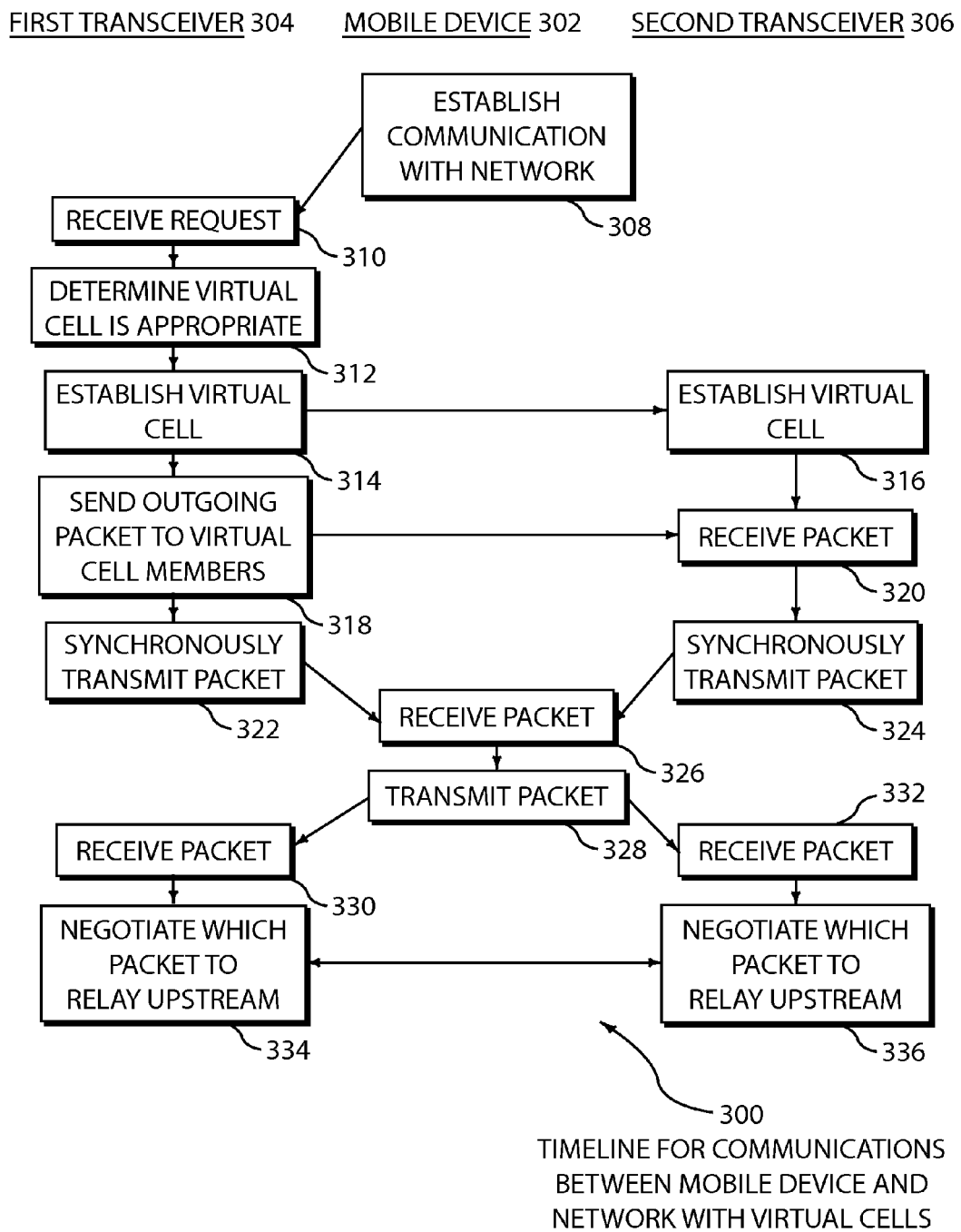
FIG. 3 is a timeline illustration of an embodiment showing communications between a mobile device and a network with virtual cells.

FIG. 3 is a timeline illustration of an embodiment 300 for communicating between a mobile device and a network with virtual cells. Actions of a mobile device are in the center column 302. Actions of a first transceiver are in the left column 304, and actions of a second transceiver are in the right column 306.

The mobile device establishes communications with the network in block 308 by communicating with the first transceiver that receives the request in block 310. After determining that a virtual cell is appropriate in block 312, the virtual cell is established in block 314 by the first transceiver and in block 316 by the second transceiver. An outgoing communications packet is sent to all virtual cell members in block 318 and received by the second transceiver in block 320. In blocks 322 and 324, both transceivers synchronously transmit the communications packet, which is received by the mobile device in block 326.

The mobile device transmits a packet in block 328, which is received by the first transceiver in block 330 and the second transceiver in block 332. Because two packets are on the network having the same information, only one packet may be relayed. Thus, the first transceiver and second transceiver negotiate which packet is to be relayed upstream in blocks 334 and 336, respectively.

The embodiment 300 illustrates many of the communications that may occur behind the scenes for operating a virtual cell with a mobile device. After determining that a virtual cell should be created, communications to the mobile device are first transmitted to the members of the virtual cell, then the communications are broadcast simultaneously.

In many cases, there may be different time delays when each radio transceiver in the virtual cell receives the communication to broadcast. In such situations, the radio transceivers may have a buffer, cache, or other memory to store the communication until the instant when the radios within the virtual cell will transmit substantially simultaneously.

The radios in the virtual cell may have a coordinating beacon or pulse that may be used to synchronize the transmission of communication packets. In some cases, the radios may keep an internal clock that is synchronized, while in other cases the coordinating beacon or pulse may be transmitted at the beginning of every coordinated transmission. Various mechanisms may be used by those skilled in the arts to coordinate the transmissions of the radios within the virtual cell.

When the mobile device transmits a communication, two or more radios within the virtual cell may receive the communication and prepare to relay the communication along the network. When such a situation occurs within a virtual cell, the duplicate packets of communication data may be destroyed so that one packet is relayed.

In some embodiments, a central controller may receive all communications from the mobile device and determine if duplicate communications were received by two or more radio transceivers. Such a central controller may be a radio transceiver that manages the virtual cell, or the central controller may be a central point along the network through which all communications pass. For example, a cable modem termination system (CMTS) in a cable television network may perform such a function. In another example, a digital subscriber line access manager (DSLAM) may perform the function in a DSL network. In other embodiments, a dedicated traffic management device may perform the function.

Figure 4:
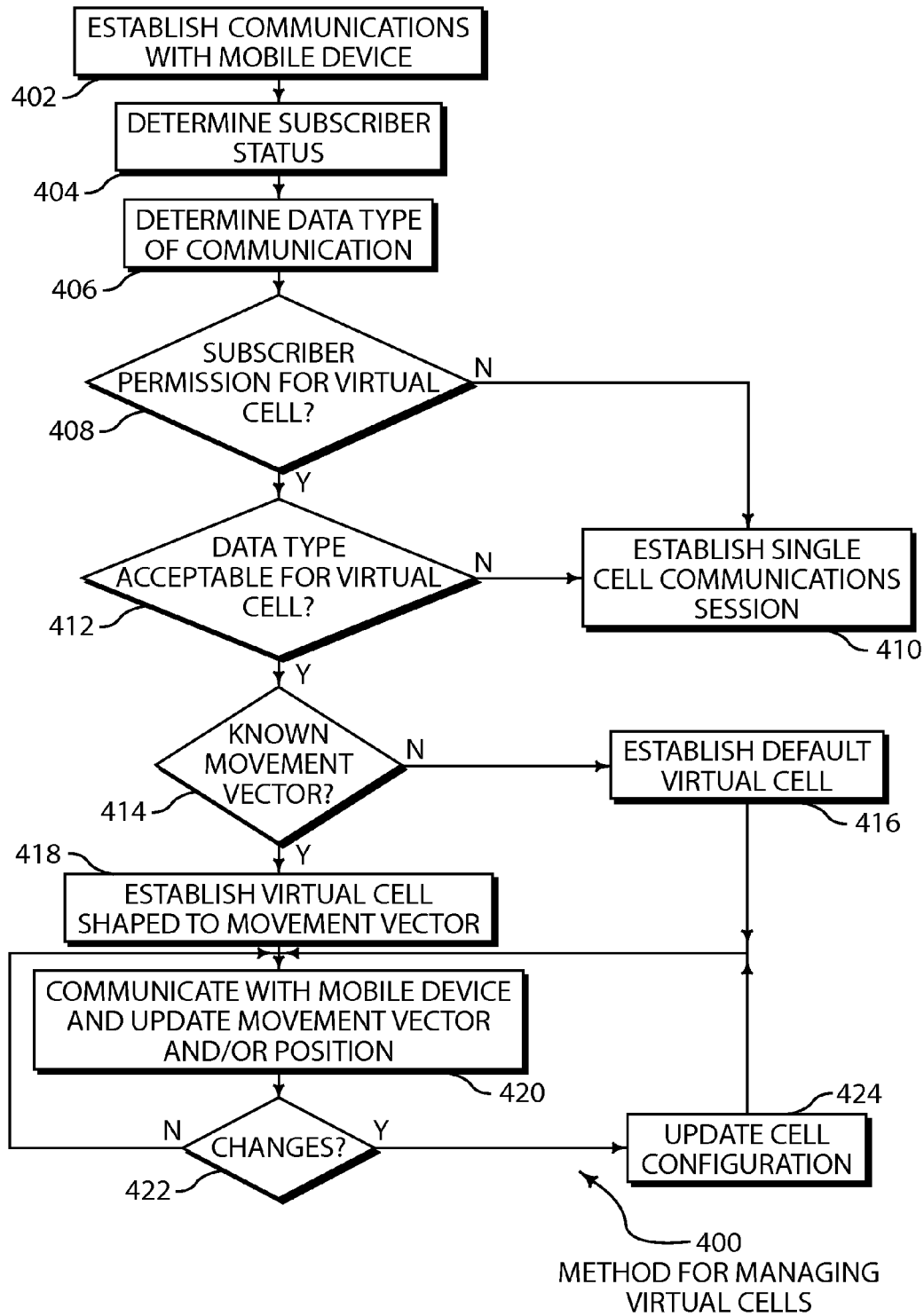
FIG. 4 is a flowchart illustration of an embodiment showing a method for managing virtual cells.

FIG. 4 illustrates an embodiment 400 of a method for managing virtual cells as viewed from the network. Communications with the mobile device are established in block 402. The subscriber's status is determined in block 404 and the data type of the communication is determined in block 406. If the subscriber does not have permission for a virtual cell in block 408, single cell communication is established in block 410. Similarly, if the data type does not warrant a virtual cell in block 412, single cell communication is established in block 410.

If the movement vector of the mobile device is not known in block 414, a default virtual cell may be established in block 416. If the movement vector is known in block 414, a virtual cell may be established that is shaped based on the movement vector in block 418. Communications occur with the mobile device through the virtual cell and the movement vector and/or position of the mobile device is updated in block 420. If the position or movement vector changes in block 422, the virtual cell configuration may be updated in block 424 and the process continues in block 420.

When a mobile device initiates communications with a network, a virtual cell may be constructed for the session if the subscriber's agreement permits a virtual cell and if the data type is proper. Many data types may not need the almost continuous connection while roaming that a virtual cell may provide. Pure data links, such as for fetching email, text messages, or web browsing may not require a virtual cell. However, real time voice communications such as voice over IP (VoIP) or other telephony communications may benefit from the virtual cell service.

Because the virtual cell has several radios broadcasting and operating in unison, the virtual cell may use several times the bandwidth of a conventional communication session between one mobile device and a radio transceiver. In many cases, the radio transceivers may otherwise operate in an independent, nonsynchronous manner such that by switching to a coordinated broadcast mechanism may require additional timing overhead. In such cases, a network may charge additional fees for the virtual cell service.

When a virtual cell cannot be established, a mobile device may be connected to a single radio transceiver in block 410. Such a connection may be allow roaming between adjacent radio transceiver coverage areas, but a handoff may occur between each coverage area.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:
1. A network comprising:
a network backbone capable of two-way communications;
a plurality of radio transceivers attached to said network backbone that:
have overlapping coverage areas;
establish communications with a first mobile device;
determine that said first mobile device is communicating with a first of said plurality of radio transceivers;
simultaneously transmit a first communication to said mobile device from a first set of said plurality of radio transceivers, said first set of said plurality of radio transceivers comprising at least two of said plurality of radio transceivers;

receive a second communication from said mobile device by one or more of said first set of radio transceivers; and a network controller adapting to determine a movement vector for the said first mobile device.

2. The network of claim 1 wherein said first set of said plurality of radio transceivers are selected based on the geographical positions of said first set of said plurality of radio transceivers.

3. The network of claim 2 further comprising:

a network controller in communication with said plurality of radio transceivers wherein said network controller is adapted to establish a virtual cell of said first set of said plurality of radio transceivers.

4. The network of claim 3 wherein said network controller is further adapted to determine a movement vector for said first mobile device.

5. The network of claim 3 wherein said network controller comprises one of said plurality of radio transmitters.

6. The network of claim 3 wherein said network controller comprises an internet access port for said network.

7. The network of claim 3 wherein said network controller is further adapted to:

detect that two or more of said radio transceivers have received said second communication; and selecting said second communication from one of said subset of plurality of radio transceivers.

8. The network of claim 7 wherein said second communication comprises a packet transmission, said packet transmission being received by at least two of said plurality of radio transceivers.

* * * * *